(12) United States Patent
Zhang et al.

(10) Patent No.: US 9,727,613 B2
(45) Date of Patent: *Aug. 8, 2017

(54) DISTRIBUTED DATA STREAM PROCESSING METHOD AND SYSTEM

(71) Applicant: Alibaba Group Holding Limited, George Town (KY)

(72) Inventors: Xu Zhang, Hangzhou (CN); Zhixiong Yang, Hangzhou (CN); Jia Xu, Hangzhou (CN); Zhonghua Deng, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,484

(22) Filed: Dec. 21, 2015

(65) Prior Publication Data

US 2016/0179898 A1 Jun. 23, 2016

Related U.S. Application Data

(63) Continuation of application No. 13/681,271, filed on Nov. 19, 2012, now Pat. No. 9,250,963.

(30) Foreign Application Priority Data

Nov. 24, 2011 (CN) .......................... 2011 1 0378247

(51) Int. Cl.
*G06F 9/46* (2006.01)
*G06F 17/30* (2006.01)
*G06F 9/50* (2006.01)

(52) U.S. Cl.
CPC .......... *G06F 17/30516* (2013.01); *G06F 9/50* (2013.01); *G06F 9/5027* (2013.01)

(58) Field of Classification Search
None
See application file for complete search history.

(56) References Cited

U.S. PATENT DOCUMENTS 5,155,851 A 10/1992 Krishnan
6,850,947 B1 * 2/2005 Chung .............. G06F 17/30563
707/600

(Continued)

FOREIGN PATENT DOCUMENTS

| CN | 101464884 A | 6/2009 |
| JP | H04167079 A | 6/1992 |
| WO | 2010128228 | 11/2010 |

OTHER PUBLICATIONS

Oracle, Oracle Database VLDB and Partitioning Guide, Jul. 2007, Oracle, B32024-01.

(Continued)

*Primary Examiner* — Dong Kim
(74) *Attorney, Agent, or Firm* — Van Pelt, Yi & James LLP (57) ABSTRACT

Embodiments of the present application relate to a distributed data stream processing method, a distributed data stream processing device, a computer program product for processing a raw data stream and a distributed data stream processing system. A distributed data stream processing method is provided. The method includes dividing a raw data stream into a real-time data stream and historical data streams, processing the real-time data stream and the historical data streams in parallel, separately generating respective results of the processing of the real-time data stream and the historical data streams, and integrating the generated processing results.

23 Claims, 6 Drawing Sheets

(56) References Cited

U.S. PATENT DOCUMENTS

| | | | |
|---|---|---|---|
| 7,403,959 B2 | 7/2008 | Nishizawa et al. | |
| 8,069,190 B2 | 11/2011 | McColl et al. | |
| 8,140,585 B2* | 3/2012 | Chen | G06F 9/30021 |
| | | | 707/752 |
| 2002/0194157 A1* | 12/2002 | Zait | G06F 17/3033 |
| 2003/0074348 A1* | 4/2003 | Sinclair | G06F 17/30339 |
| 2003/0149702 A1* | 8/2003 | Saffer | G06F 17/30595 |
| 2004/0210826 A1* | 10/2004 | Najork | G06F 17/3089 |
| | | | 715/205 |
| 2004/0249644 A1* | 12/2004 | Schiefer | G06Q 10/06375 |
| | | | 705/7.37 |
| 2005/0010660 A1* | 1/2005 | Vaught | H04L 12/2602 |
| | | | 709/223 |
| 2005/0038784 A1* | 2/2005 | Zait | G06F 17/30312 |
| 2005/0138111 A1 | 6/2005 | Aton et al. | |
| 2006/0230029 A1* | 10/2006 | Yan | G06Q 30/02 |
| 2006/0247928 A1 | 11/2006 | Cowdery | |
| 2008/0253287 A1 | 10/2008 | Gupta et al. | |
| 2008/0270403 A1* | 10/2008 | Bookman | G06F 8/51 |
| 2009/0182779 A1* | 7/2009 | Johnson | G06F 17/30383 |
| 2010/0031003 A1* | 2/2010 | Chen | G06F 9/30021 |
| | | | 712/30 |
| 2010/0121860 A1 | 5/2010 | Pan et al. | |
| 2010/0235348 A1* | 9/2010 | Baby | G06F 17/30911 |
| | | | 707/715 |
| 2011/0016379 A1 | 1/2011 | McColl et al. | |
| 2011/0035272 A1* | 2/2011 | Bhatt | G06Q 30/02 |
| | | | 705/14.42 |
| 2011/0071958 A1* | 3/2011 | Grody | G06Q 40/00 |
| | | | 705/36 R |
| 2011/0273459 A1 | 11/2011 | Letellier et al. | |
| 2011/0276993 A1 | 11/2011 | Ferguson | |
| 2011/0307897 A1* | 12/2011 | Atterbury | G06F 9/4436 |
| | | | 718/102 |
| 2012/0150791 A1* | 6/2012 | Willson | G06F 17/30563 |
| | | | 707/600 |
| 2013/0124483 A1* | 5/2013 | Furuhashi | G06F 17/30315 |
| | | | 707/661 |
| 2013/0124668 A1* | 5/2013 | Idziorek | G06F 13/385 |
| | | | 709/214 |

OTHER PUBLICATIONS

He Zhiyong et al. "A Prediction Framework for Distributed Data Stream Processing." Circuits, Communications and Systems, 2009. PACCS'09. Pacific-Asia Conference on. IEEE, 2009.

* cited by examiner

DISTRIBUTED DATA STREAM PROCESSING METHOD AND SYSTEM

CROSS REFERENCE TO OTHER APPLICATIONS

This application is a continuation of co-pending U.S. patent application Ser. No. 13/681,271, entitled DISTRIBUTED DATA STREAM PROCESSING METHOD AND SYSTEM filed Nov. 19, 2012 which is incorporated herein by reference for all purposes, which claims priority to People's Republic of China Patent Application No. 201110378247.3 entitled A DISTRIBUTED DATA STREAM PROCESSING METHOD AND CORRESPONDING SYSTEM filed Nov. 24, 2011 which is incorporated herein by reference for all purposes.

FIELD OF THE INVENTION

This application relates to a distributed data stream processing method and system.

BACKGROUND OF THE INVENTION

Data stream processing has become one of the primary means of data mining and data analysis. One example of a data stream includes a web log which is a data stream including a large volume of data. Another example of a data stream includes an e-commerce website that continuously adds product posting information, continuously adds text message transmission records, and the like. Such data streams have the following features: (1) a large volume of data, (2) each piece of the data has an identifier (ID) where the characteristics of each ID must be analyzed, and (3) a time attribute, for example, a chronological property.

Data stream analysis generally requires that the analysis must be performed in real-time and at a high-speed. Accordingly, data stream analysis systems are able to provide a real-time response based on the current actions of specific users. For example, by performing a real-time analysis of logs, the current status of the user and recent access activity may be analyzed to more effectively increase accuracy of recommendations, or to provide real-time anti-spamming. However, it has always been technically difficulty to analyze data streams at high speeds in order to satisfy the real-time requirement. In particular, the technical analysis is even more difficult when the data volumes are very large.

Figure 1:
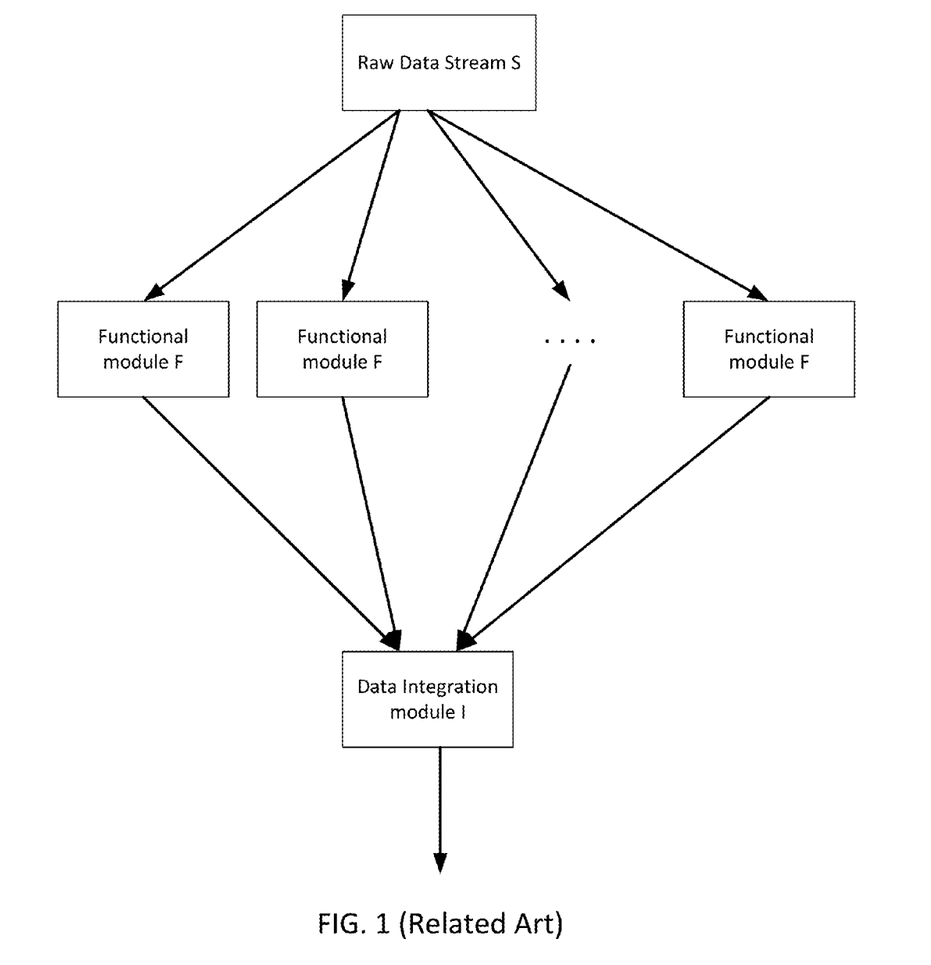
FIG. 1 is a schematic diagram illustrating an example of a conventional distributed data stream processing system.

An embodiment of a conventional distributed data stream processing system is illustrated in FIG. 1. A raw data stream S is distributed to a plurality of functional modules F. The plurality of functional modules F performs processing simultaneously, and transmits the results of the processing to a data integration module I. The data integration module I integrates the processed data and outputs the integrated data. However, the following limitation occurs in existing distributed data stream processing systems:

(1) In the processing of the data streams having large volumes of data, the data processing and data analysis become very time consuming. Also, existing distributed data stream processing systems generally employ a shared memory model. The shared memory model is a method of exchanging data between different modules. In particular, the exchanging of data occurs between upstream and downstream modules. For example, the results of module A are placed in memory (a database, a file, etc.) and then module B reads the results from the memory. Thus, a data exchange occurs between the modules A and B. With such a model, real-time computing is not easily achievable; only quasi-real-time computing can be achieved. In other words, when the model cannot handle processing the existing data stream, most of the existing processing technology is unable to satisfy the growth rate of the large volume of data in real-time data streams, and the delay in processing the data may be relatively long. Thus, data analysis can only be performed offline, leading to further delays in data analysis and data mining. Accordingly, due to the delays, timely responding to current or recent actions of users is difficult.

(2) Distributed parallel computing has already become popular for processing large volumes of data. However, existing parallel computing systems are essentially limited to a framework of functional reproduction. Functional reproduction is a method of implementing parallel computing where all computing modules have the same function and run the same processes. The computing modules only differ in the computed data, and computing systems use the computing modules to implement parallel computing. Thus, due to the computing modules, parallel computing is impossible to implement with more precision. Also, due to the computing modules, implementation of modularization and hot swapping is impossible. Also, it is difficult to perform maintenance of the computing modules.

BRIEF DESCRIPTION OF THE DRAWINGS

Various embodiments of the invention are disclosed in the following detailed description and the accompanying drawings.

The embodiments of the present application are described below with reference to the drawings, wherein.

DETAILED DESCRIPTION

The invention can be implemented in numerous ways, including as a process, an apparatus, a system, a composition of matter, a computer program product embodied on a computer readable storage medium, and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application is described in detail below.

Although the embodiments of the method and the systems of the present application are described below using the example of a web log data stream, it is understandable that the present application may also be used to process data streams of systems such as personalized recommendations, real-time anti-spamming, product listings, text message transmissions, scientific computing data, and the like.

Figure 2:
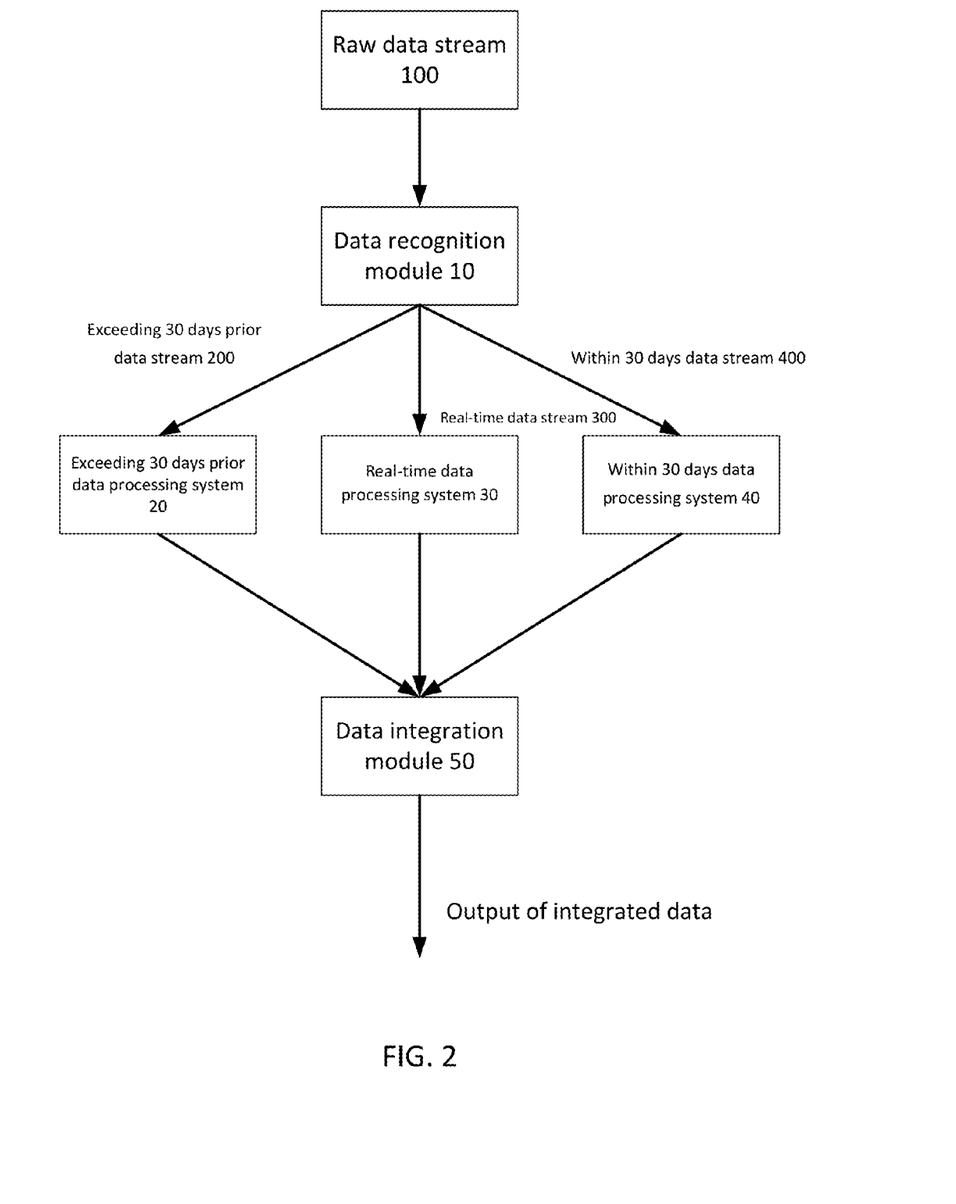
FIG. 2 is a schematic diagram illustrating an embodiment of a large data volume distributed data stream processing system.

FIG. 2 is a schematic diagram illustrating an embodiment of a large data volume distributed data stream processing system.

The large data volume distributed data stream processing system of FIG. 2 includes: a data recognition module 10, an exceeding 30 days prior data processing system 20, a real-time data processing system 30, a within 30 days data processing system 40, and a data integration module 50. The data recognition module 10 determines whether data contained in a raw data stream is real-time data, data within 30 days, or data exceeding 30 days prior. The exceeding 30 days prior data processing system 20, the real-time data processing system 30, and the within 30 days data processing system 40 each processes data and transmits the processed data to the data integration module 50. The data integration module 50 integrates the received data together. These modules may be implemented by one computer or similar equipment having computing or processing capabilities, a network formed from multiple pieces of such equipment, or a portion of the hardware or software of such equipment.

Figure 3:
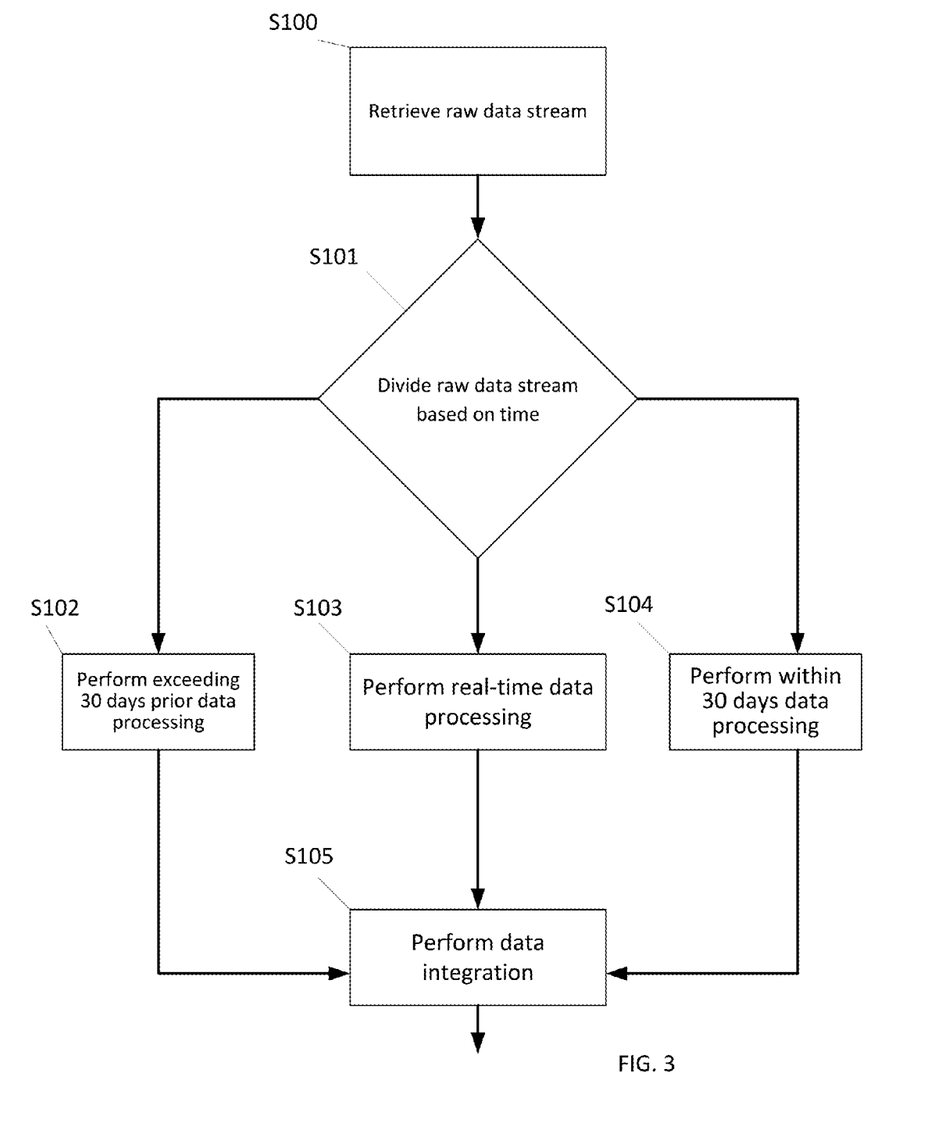
FIG. 3 is a flowchart illustrating an embodiment of a large data volume distributed data stream processing method corresponding to the large data volume distributed data stream processing system of FIG. 2.

FIG. 3 is a flowchart illustrating an embodiment of a large data volume distributed data stream processing method. The large data volume distributed data stream processing method can be performed on the large data volume distributed data stream processing system of FIG. 2.

Step S100: a raw data stream 100 is retrieved. Using the example of a web log data stream, the raw data stream comprises unprocessed web logs.

Step S101: After the raw data stream 100 is retrieved by the data recognition module 10, the data recognition module 10 determines whether data contained in the raw data stream 100 is real-time data, data within 30 days, or data exceeding 30 days prior. In some embodiments, the determination is made by evaluating a timestamp associated with the data. The data recognition module 10 thereby divides the raw data stream 100 chronologically into an exceeding 30 days prior data stream 200, a real-time data stream 300 and a within 30 days data stream 400. The exceeding 30 days prior data stream 200 is transmitted to the exceeding 30 days prior data processing system 20, the real-time data stream 300 is transmitted to the real-time data processing system 30, and the within 30 days data stream 400 is transmitted to the within 30 days data processing system 40. In some embodiments, a data stream is determined to be a real-time data stream in the event the data stream has been received within the past 2 days and a data stream that is older than 2 days is determined to be a within 30 days data stream. In some embodiments, a point in time differentiating the real-time data from the data within 30 days can be 1 day, 1 week, or any other length of time.

Step S102: The exceeding 30 days prior data processing system 20 processes exceeding 30 days prior data from the exceeding 30 days prior data stream 200, and transmits the processing results to the data integration module 50. Step S103: The real-time data processing system 30 processes real-time data from the real-time data stream 300, and transmits the processing results to the data integration module 50. Step S104: The within 30 days data processing system 40 processes within 30 days data from the within 30 days data stream 400, and transmits the processing results to the data integration module 50. Steps S102, S103, and S104 are executed in parallel.

Data from the real-time data stream 300 can include user behavior. For example, each user click can be an item in the real-time data stream 300. The item can include user information, behavior information, time etc.

For the real-time data processing system 30, each item of the real-time data stream 300 can represent a user's real-time behavior, and can be processed in real-time. In other words, the real-time data stream 300 can include what the user did and a corresponding real-time decision as determined by the real-time data processing system 30. The same item is recorded in the log file, and after two days, the within 30 days data processing system 40 processes the log file. Afterwards, the results of the within 30 days data processing system 40 is sent to the data integration module 50.

In the meantime, the real-time data processing system 30 continues to process the real-time data stream 300. The results from the real-time data processing system 30 are computed. Also, at this time, the results of the within 30 days data processing system 40 are computed.

For the exceeding 30 days prior data processing system 20 and the within 30 days data processing system 40, the difference is that the exceeding 30 days prior data processing system 20 processes data exceeding 30 days prior and the within 30 days data processing system 40 processes data within 30 days. The results of the data processing systems are combined by the data integration module 50. Accordingly, all the data is processed.

In some embodiments, the real-time data processing system 30 and the within 30 days data processing system 40 process the same data. In other words, data from the real-time data stream 300 and the within 30 days data stream 400 are the same. The real-time data stream 300 is simultaneously written to the real-time data processing system 30 and a log file. A daily copy of the log file is output to the within 30 days data processing system 40. The within 30 days data processing system 40 reads the log file daily, processes the within 30 days data stream 400, and outputs the results. The results of the within 30 days data processing system 40 are used by the system two days after the actual time the data is output to the log file. In other words, the real-time data processing system 30 processes the data from the real-time data stream 300 within two days, and the within 30 days data processing system 40 generates its results after a two day delay. The real-time data processing system 30 maintains and processes data from the real-time data stream 300 (data within two days and forms real-time results), and there is a two day delay from the time the data from the real-time data stream 300 is processed and used by the within 30 days data processing system 40. The results of the real-time data processing system 30 and the within 30 days data processing system 40 are later combined at a 2 day point in time.

In some embodiments, the real-time data processing system 30 processes data from the real-time data stream 300 at the time the data is input. Furthermore, whenever new data is received, the real-time data processing system 30 processes the received data in real-time.

Step S105: The data integration module 50 integrates the processing results received from the exceeding 30 days prior data processing system 20, the real-time data processing system 30, and the within 30 days data processing system 40, and outputs the integrated data. In some embodiments, the exceeding 30 days prior data processing system 20 and the within 30 days data processing system 40 output to log files. Data processed by the exceeding 30 days prior data processing system 20 has a timestamp exceeding 30 days, and data processed by the within 30 days data processing system 40 has a timestamp within 30 days. In some embodiments, the processing results from processing systems 20, 30, and 40 have the same format for ease of integration.

The integrated results can provide the behavior of a user and the corresponding actions of the user. For example, the real-time processing system 30 can determine that user A purchased products p1 and p2. Those results are sent to the data integration module 50. At the same time, the data integration module 50 can also process the results from the within 30 days data processing system 40. The results from the within 30 days data processing system can show that the user A has also purchased products p3, p2 and p4 within 30 days. At the same time, the data integration module 50 can process the results from the exceeding 30 days prior data processing system 20. The results from the exceeding 30 days prior data processing system 20 shows that the products p5, p6 and p7 were purchased more than 30 days ago. The data integration module 50 provides a record of all of user A's actions.

The raw data stream 100 is divided by the data recognition module 10 into three different data streams separated by three predefined time limits including: the exceeding 30 days prior data stream 200, the real-time data stream 300, and the within 30 days data stream 400. However, one of ordinary skill in the art may use other time limits to divide the raw data stream 100 based on actual requirements. For example, the raw data stream 100 may be divided into fewer or more time segments, time limits other than 30 day segments or the time range considered to be "real-time" may be determined based on actual requirements.

As discussed above, the large data volume distributed data stream processing method is basically divided into three stages. The three stages include chronological division, data processing, and data integration.

In the chronological division stage, because web log data is constantly increasing, the data recognition module 10 first transmits the real-time data stream 300 to the real-time processing system 30 and the historical data streams are transmitted to the historical data processing systems. The historical data streams may include the exceeding 30 days prior data stream 200 and the within 30 days data stream 400, and the historical data processing systems may include the exceeding 30 days prior data processing system 20 and the within 30 days data processing system 40. The historical data streams are not sent to the real-time processing system 30 because the data of the historical data streams are already stored in files.

In the data processing stage, the historical processing systems and the real-time processing system process data from the different time segments in parallel.

In the data integration stage, the results of parallel processing of the data from the different time segments are transmitted to the data integration module 50. After the results are integrated, the integrated results may be outputted to an external service.

One of the benefits of the system chronologically dividing the data into a plurality of data streams is that the processing of large volume data streams having chronological properties may be performed quicker.

Assuming that each piece of information in the data stream (e.g., a specific piece of log data) has a timestamp, the data ranging from the earliest data to the present data (ever growing) constitutes the total data stream. A certain point in time may be set as a division point. The data of the data stream may be divided into historical data and real-time data based on the set division point. For the data stream, the historical data preceding the time division point already existed at the certain point in time may be assumed. For example, it may be determined that data streamed one day earlier than the time division point does not need to be processed in real time, and may be processed offline. Subsequently, the results of the real time processing system and the results of the historical data processing systems may be integrated.

Separate processing of historical data and real-time data, and the processing of the historical data offline may alleviate real-time computing tremendously. The reduction of the real-time computing enables the real-time data to be computed more quickly. At the same time, the historical data may be computed more thoroughly.

The historical data refers to the log files output by the exceeding 30 days prior data processing system 20 and the within 30 days data processing system 40. The data processed by the real-time processing system 30 is processed in real-time. For the exceeding 30 days prior data processing system 20 and the within 30 days data processing system 40, the data to be processed does not change quickly, and thus, the data is referred to as historical data.

In one example, the different processing of the historical data and the real-time data is expressed in the different computation platforms and computation methods. Since the exceeding 30 days prior data processing system 20 processes the most data, the exceeding 30 days prior data processing system 20 can use a distributed platform. Since the within 30 days data processing system 40 does not process as much data as the exceeding 30 days prior data processing system 20, the within 30 days data processing system 40 can use a data warehouse platform. Since the real-time processing system 30 processes the least amount of data, e.g., only two days of data but requires real-time computation, the real-time processing system 30 can use a plurality of machines for real-time processing and store the data in memory.

Since the exceeding 30 days prior data processing system 20 and the within 30 days data processing system 40 can process data off-line and use complex formulas, the exceeding 30 days prior data processing system 20 and the within 30 days data processing system 40 require computation precision and are less concerned about computation time and efficiency. For example, the exceeding 30 days prior data processing system 20 and the within 30 days data processing system 40 may use exponents in the computation of the decay of a user's preferences. On the other hand, the real-time processing system 30 uses real-time computation, and must respond to events in real-time. Thus, the real-time processing system 30 performs computation quickly, and precision is less important than efficiency.

An embodiment of the process divides the data sequentially to process the data from different time segments (including real-time and historical time segments,) and proceeds to process the data from the different time segments in parallel. Thus, the present application ensures that the real-time data is timely processed.

In order to further improve the performance of the real-time data processing system, the real-time data processing system may further divide the time segregated data streams into different data units according to a dimension. As used herein, a dimension refers to a property or type of the data. For example, data having different dimensions may be processed by different types of functional modules. A unit of information of the data or data unit may be called a data block. The processing of a unit of information of the data (data block) is described below using an embodiment of the real-time data processing system 30.

For example, the data may relate to a user's behavior. The data can include information relating to browsing for products, reviewing information, keyword lookups, etc. Each of the different types of data refers to a different dimension, and each of the different dimensions can be computed by a different module.

For example, module M1 processes the record of the user's browsing information to determine what information the user prefers, module M2 processes the record of the user's visiting products to determine what product the user prefers, and module M3 processes the record of the user's keyword searches to determine which keywords the user prefers. Modules M1, M2, and M3 are independent from each other and can be processed in parallel. The combined results of modules M1, M2, and M3 indicate the user's preferences. The user preferences include information preference, product preference, key word preference, and any other appropriate dimensions.

Figure 4:
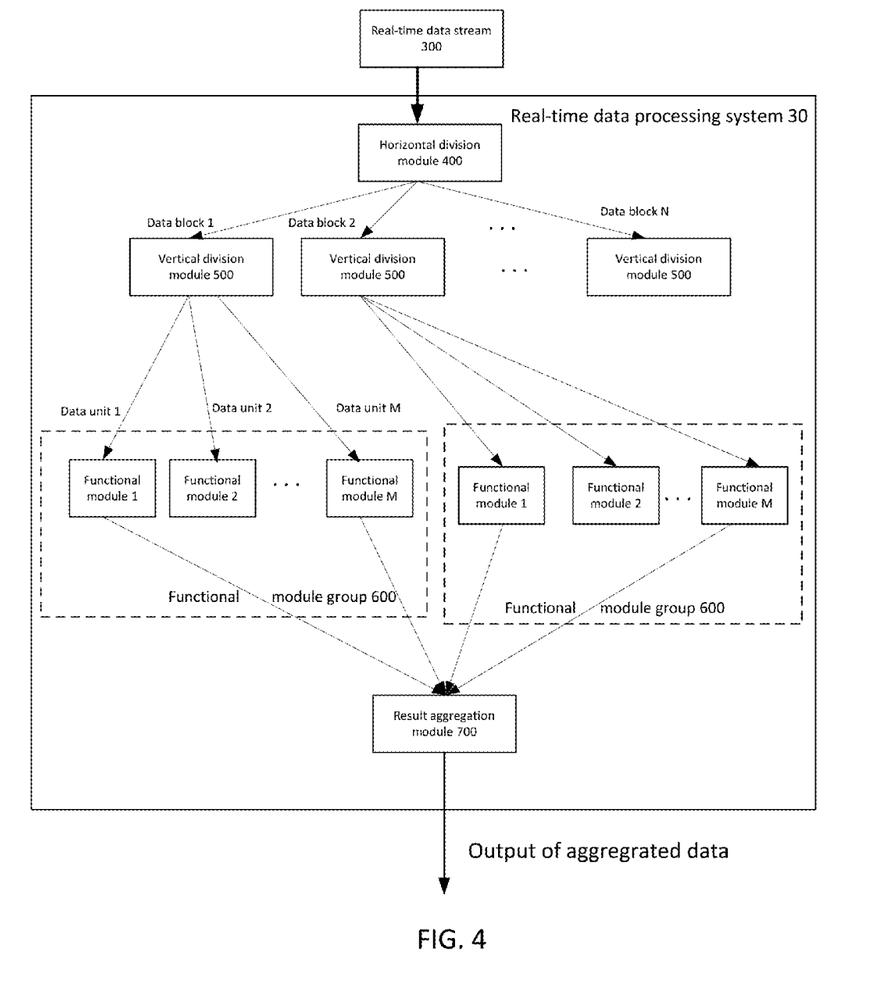
FIG. 4 is a schematic diagram illustrating an embodiment of a real-time processing system.

FIG. 4 is a schematic diagram illustrating an embodiment of a real-time processing system.

As shown in FIG. 4, the real-time processing system 30 includes one horizontal division module 400; a plurality of N vertical division modules 500, a plurality of N×M functional module groups 600, where each of the N vertical division modules 500 has a plurality of associated M functional modules, and a result aggregation module 700. In the present application, the word "horizontal" is only intended to identify a level of division, and the word "horizontal" is not intended to identify a directional concept. In the present application, the word "vertical" is only intended to identify a level of division, and the word "vertical" is not intended to identify a directional concept.

Figure 5:
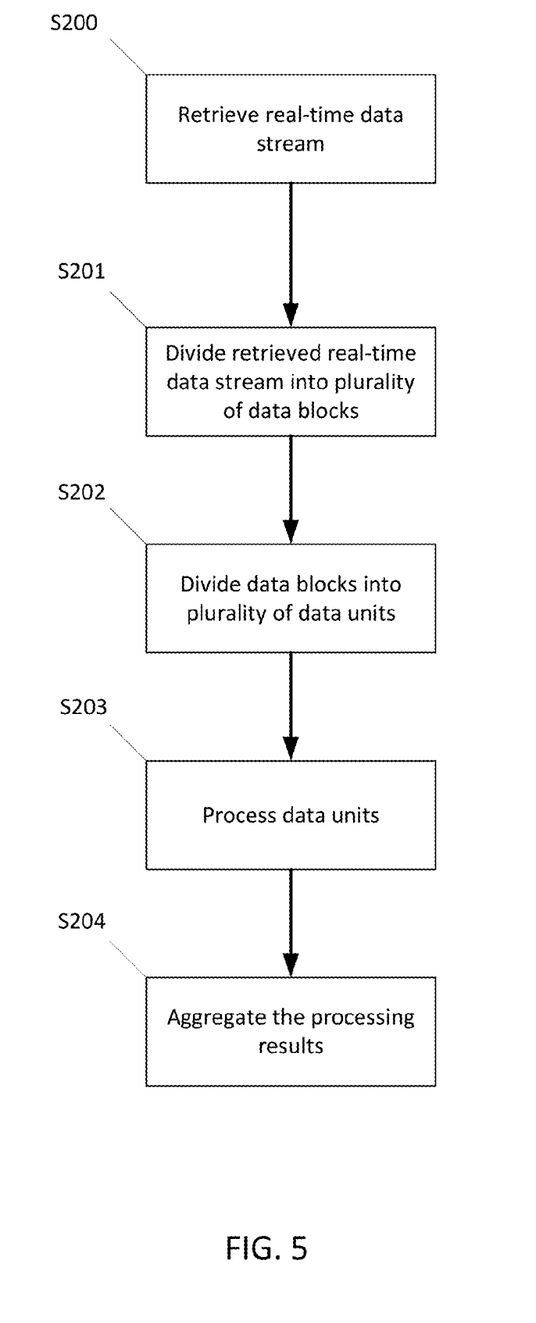
FIG. 5 is a flowchart illustrating an embodiment of a real-time processing method corresponding to the real-time processing system of FIG. 4.

FIG. 5 is a flowchart illustrating an embodiment of a real-time processing method. The method can be performed by the real-time processing system 30 of FIG. 4.

Step S200: The real-time data stream 300 is retrieved.

Step S201: The horizontal division module 400 divides the retrieved real-time data stream 300 into a plurality of N data blocks (1, 2, . . . N). The division in step S201 is referred to as a horizontal division. The horizontal division may be based on a predefined time division point. In some embodiments, the time division point is the point in time separating a real-time data stream from a within 30 days data stream. For example, historical data is stored by dates, the exceeding 30 days prior data processing system 20 of FIG. 2 processes data exceeding 30 days prior, the within 30 days data processing system 40 of FIG. 2 processes data within 30 days using the data delayed by two days and within 30 days, and the real-time processing system 30 of FIG. 2 processes data from the most recent two days. The horizontal division module 400 transmits the divided data blocks to a corresponding plurality of N vertical division modules 500.

In this example, the 30 day division can be manually configured. In some embodiments, the configuration can be modified via a configuration file. Modules 1 to N each have the same capabilities (M1, M2 . . . ). For example, to compute a user's preferences, when information of user 1 is obtained in real-time, a mapping technique (e.g., hash) is used to compute user 1's preferences using module M1 (hash(user1)=1). Similarly, when user 2's data is obtained in real-time, we get 3 (hash(user2)=3), and therefore user 3's data is sent to module M3 for processing. Modules M1, M2, M3, etc. each can simultaneously process data from different users.

As shown in FIG. 4, a first data block is transmitted to a first vertical division module 500, a second data block is transmitted to a second vertical division module 500, and so on until the $N^{th}$ data block is transmitted to the $N^{th}$ vertical division module 500. Although the real-time data stream is unlimited, the real-time data stream is transient. Each of the N vertical division modules 500 may be used again after the processing of the data block by the vertical division module 500 is completed. Thus, the number of vertical division modules 500 may be determined based on the flow volume of the real-time data stream.

Step S202: Each vertical division module 500 divides the received data block into a plurality of data units. Depending on the actual circumstances, the received data block may be divided into as many as M data units. In some embodiments, the number of modules M is determined based on the available resources, i.e., number of available machines. In some embodiments, the number of modules M is determined by a configuration file. The content of the configuration file represents the available resources. The division of the data block in this step is referred to as vertical division, and the vertical division may be based on a dimension. Each vertical division module 500 separately transmits the divided data units to a plurality of different functional modules contained in a functional module group 600. A number of functional modules may correspond to the number of M data units. The number of functional modules may be as many as M.

The vertical divisions take data of different dimensions and send the vertically divided data to different processing modules each having different functions. The different processing modules process the vertically divided data in parallel. An example of three dimensions relating to user preferences include product preference, information preference, and key word preference, which are sent to different processing modules.

Another example includes real-time processing of information of a product. When the information of the product is entered into the real-time processing system 30, the product information includes dimensions such as picture information of the product, price of the product, name of the product, etc. At this time, a dividing module divides the product information. For example, the dividing module sends picture information to a picture processing module, price information to a price processing module, and name information to a content processing module. These different modules process different dimensions. The combined result is the result of processing the product information. In this example, the different modules are predefined to process different dimensions of information.

As shown in FIG. 4, the first vertical division module 500 divides a data block 1 into M data units, and transmits the first data unit to the first functional module of the first functional module group 600, transmits the second data unit to the second functional module of the first functional module group 600, and so on, until the first vertical division module 500 transmits the $M^{th}$ data unit to the $M^{th}$ functional module of the first functional module group 600.

Accordingly, in response to the flow volume of the real-time data stream 300 of FIG. 2 being sufficiently large, a second vertical division module 500 may divide a data block 2 into a plurality of M data units, and transmits the first data unit to the first functional module of a second functional module group 600, transmits the second data unit to the second functional module of the second functional module group 600, and so on, until the second vertical division module 500 transmits the $M^{th}$ data unit to the $M^{th}$ functional module of the second functional module group 600.

Accordingly, in response to the flow volume of the real-time data stream 300 being sufficiently large, other vertical division modules 500 may transmit other data units to functional modules of other functional module groups 600. The number of vertical division modules 500, functional module groups 600, and functional modules contained in the functional module groups 600 may be determined based on the flow volume of the real-time data stream 300.

Step S203: Each functional module processes the data unit received, and transmits the results of the processing to the result aggregation module 700.

Steps S202 and S203 can be executed in parallel.

Step S204: The result aggregation module 700 aggregates the results received and outputs the aggregated results.

As described in the present application, the real-time data stream is horizontally divided and allocated to each processor where the function of each processor is the same. The processors perform the processing in parallel, which greatly increases the speed of the processing of the real-time data stream. The processors may correspond to the vertical division modules 500.

Then, the vertical division modules 500 perform a vertical division of the data blocks according to dimension. In other words, the vertical division modules 500 extract data units of different dimensions from the data. Subsequently, the data units of a corresponding dimension are transmitted to corresponding functional processing modules, and the data units are processed in parallel by the functional processing modules. The functional processing modules may correspond to functional modules.

Based on the example of the web log data stream corresponding to the raw data stream, the web log data stream may be first horizontally divided into a plurality of log information data blocks. The horizontal division may be based on time. In some embodiments, the data blocks are divided into real-time data blocks, within 30 days data blocks and exceeding 30 days prior data blocks. Each log information data block may be allocated to a corresponding vertical division module 500. Subsequently, each vertical division module 500 vertically divides the corresponding log information data block according to another dimension. The other dimension may not correspond to time. For example, product information may be extracted from the log information data block and the extracted product information may be sent to a product processing element, and in parallel, keyword information may be extracted from the log information data block and the extracted keyword information may be sent to a keyword processing element. In this example, each information data block is further divided into smaller data units having a finer granularity. The smaller data units are distributed to the various functional modules for parallel processing. In another example, as the functional modules process a real-time web log data stream, a product information functional module processes product information data, an access path functional module processes access paths data, and each functional module processes the data in parallel. Subsequently, the user information and the product information may be sent to a recommendation functional module that makes product recommendations based on the user information and the product information, the user information and the access path information may be sent to an anti-spamming module, and other information may be sent to other functional modules to be processed in parallel.

An example of information that may be sent to an anti-spamming module can occur when the real-time processing system 30 determines that the number of visits of a user exceeds a threshold within a predetermined amount of time. For example, information can be sent to the anti-spamming module when a user makes 200 visits within 5 minutes.

Another example is when the historical data indicates that a user prefers clothing and low prices. However, if one day the user makes a large number of visits to view high-priced electronic products, the information indicates that the user's account may be compromised and an alarm system is triggered.

The processing results of each functional module may be transmitted to an integrator, and the integrator performs integration (aggregation) of the processing results. For example, the integrator may correspond to the result aggregation module 700. The integrator may also further include the data integration module 50 of FIG. 2.

The division of data in the present application has been described above using the above embodiment of the real-time data processing system. One of ordinary skill understands that for historical data processing systems, a framework similar to the real-time data processing system may be used. The difference between the historical data processing system and the real-time data processing system is that historical data processing may employ a method of periodic runs. The method of periodic runs may involve processing the historic data at periodic time periods and not processing the historic data in real-time. Accordingly, a low-cost cluster distributed computing system may be used as the historical data processing system.

As discussed above, unlike existing distributed data stream processing systems, the present application does not employ the shared memory model, but instead the present application performs a plurality of horizontal and vertical divisions of data based on chronological properties and other dimensions of the data. In other words, the present application utilizes chronological properties and employs a multi-level framework to process the data. The present application divides the data into segments based on time for processing (horizontal division), and uses the new distribution framework to perform vertical division of the data stream utilizing different dimensions (vertical division), rather than being limited to a framework of functional reproduction found in existing parallel computing systems. In other words, in the parallel processing of the above described methods, not all computing modules have the same functions and execute the same processes with the only differing part of the computing modules being the computed data. Therefore, the present application is able to implement the parallel processing of data with finer granularity, and is also able to implement modularization and the hot swapping of the functional modules. Accordingly, due to the improved modularization and hot swapping capabilities of the functions modules, the systems are easier to maintain.

The present application allows real-time processing of large volumes of data. The distributed parallel processing is used to process real-time data streams simultaneously to ensure the real-time processing of large volumes of data and improve the system's responsiveness.

The large data volume distributed data stream processing method based on the present application may be implemented using a single or multiple pieces of processing equipment having computing and processing capabilities. The large data volume distributed data stream processing system based on the present application may be a single or multiple pieces of processing equipment. For example, the processing equipment may be a single or multiple computers running computer-executable instructions. The individual modules or elements may be components of equipment that have corresponding functions when computer-executable instructions are executed by the processing equipment. In one embodiment, based on the present application, languages such as JAVA or SQL may be used on Linux or Windows-based systems to implement the above large data volume distributed data stream processing method and corresponding system.

Figure 6:
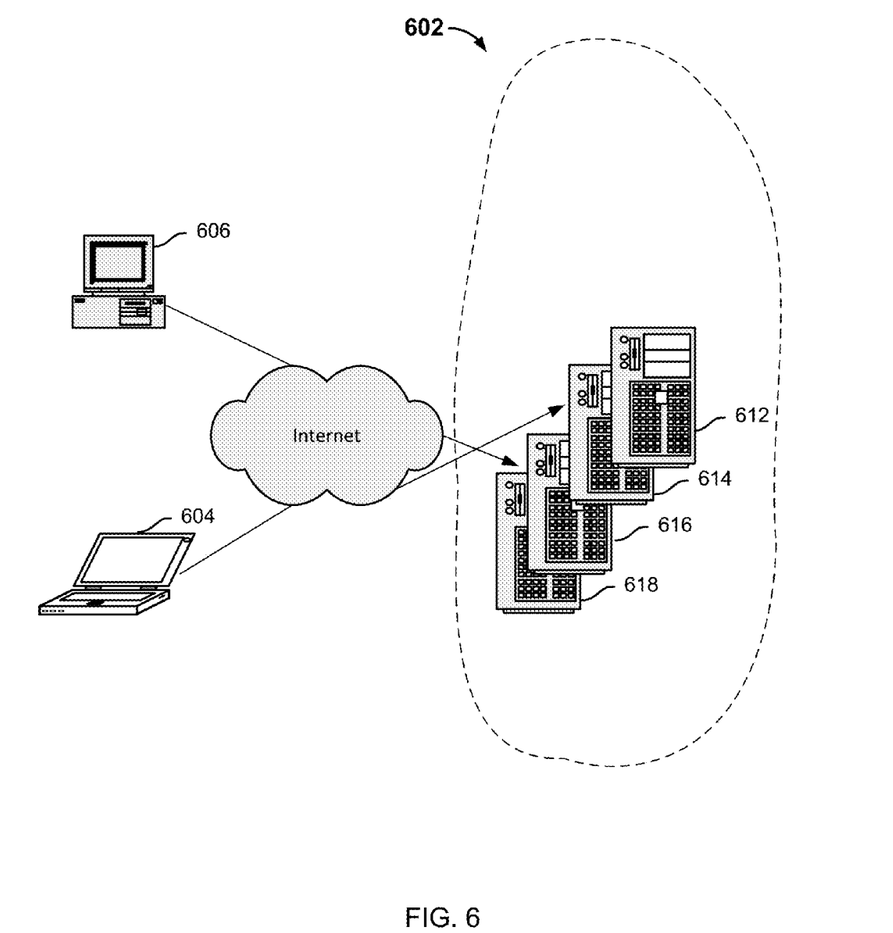
FIG. 6 is a diagram illustrating another embodiment of a large data volume distributed data stream processing system.

FIG. 6 is a block diagram illustrating an embodiment of a real-time processing method corresponding to the real-time processing system of FIG. 4. In this example, system 602 includes a plurality of application servers 612, 614, 616, and 618. Although four application servers are used for purposes of example, a different number of application servers may be used in other embodiments. A real-time data stream from clients such as 604 and 606 are received by the application servers. The clients and the application servers may communicate over TCP/IP or any other network protocol.

The application servers 612, 614, 616, and 618 include a data recognition module configured to divide the raw data stream into a real-time data stream and historical data streams, a parallel processing module configured to process the real-time data stream and the historical data streams in parallel, and separately generate respective processing results, and a data integration module configured to integrate the generated results of the processing.

The modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, networking equipment, etc.) to implement the methods described in the embodiments of the present application. The modules may be implemented on a single device or distributed across multiple devices. The functions of the modules may be merged into one another or further split into multiple sub-modules.

Although the present application has already been described with reference to typical embodiments, it should be understood that the terms used are explanatory and exemplary, and are not restrictive terms. Because the present application can be implemented in a variety of forms without departing from the spirit or substance of the invention, it should therefore be understood that the above embodiments are not limited by any of the above details, and should be broadly interpreted within the spirit and scope of the attached claims. Therefore, all changes and modifications falling within the scope of the claims or their equivalents should be covered by the attached claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a number of a plurality of division modules based on flow volume of a raw data stream;
    dividing the raw data stream into a real-time data stream and one or more historical data streams based on the number of the plurality of division modules;
    processing the real-time data stream and the one or more historical data streams in parallel, comprising:
        dividing the real-time data stream into a plurality of data units based on a plurality of dimensions, the plurality of dimensions including a first dimension and a second dimension, wherein a first data unit is associated with the first dimension, and wherein a second data unit is associated with the second dimension;
        determining a number of a plurality of functional modules within a functional module group and a number of a plurality of functional module groups based on a number of the plurality of data units and resources available to be used to process the plurality of data units;
        processing, via the plurality of functional modules, the first data unit and the second data unit in parallel, the plurality of functional modules including a first functional module and a second functional module, wherein the first data unit is processed by the first functional module, and wherein the second data unit is processed by the second functional module; and
        aggregating results of the processing performed by the first functional module and the second functional module;
    separately generating respective results of the processing of the real-time data stream and the one or more historical data streams; and
    integrating the respective generated processing results.

2. The method as described in claim 1, wherein the processing of the real-time data stream is performed based on a dimension, and wherein one data block of the real-time data stream is processed in parallel with another data block of the real-time data stream.

3. The method as described in claim 1, wherein the processing of the real-time data stream comprises:
    dividing the real-time data stream into a plurality of data blocks;
    dividing each data block into the plurality of data units; and
    aggregating the results of the processing of the plurality of data units.

4. The method as described in claim 3, wherein the dividing of the real-time data stream into the plurality of data blocks is based on time.

5. The method as described in claim 1, wherein the processing of the one or more historical data streams includes dividing the one or more historical data streams based on one or more dimensions and the dividing of the one or more historical data streams is performed with the dividing of the real-time data stream in parallel.

6. The method as described in claim 1, wherein the real-time data stream and the one or more historical data streams are processed separately.

7. The method as described in claim 1, wherein a dimension is associated with a behavior of a user.

8. The method as described in claim 1, wherein different preferences of a user correspond to different dimensions, and data units associated with different dimensions are processed separately.

9. A device, comprising:
a processor; and
a memory coupled with the processor, wherein the memory is configured to provide the processor with instructions which when executed cause the processor to:
determine a number of a plurality of division modules based on flow volume of a raw data stream;
divide the raw data stream into a real-time data stream and one or more historical data streams based on the number of the plurality of division modules;
process the real-time data stream and the one or more historical data streams in parallel and separately generate respective processing results, comprising to:
divide the real-time data stream into a plurality of data units based on a plurality of dimensions, the plurality of dimensions including a first dimension and a second dimension, wherein a first data unit is associated with the first dimension, and wherein a second data unit is associated with the second dimension;
determine a number of a plurality of functional modules within a functional module group and a number of a plurality of functional module groups based on a number of the plurality of data units and resources available to be used to process the plurality of data units;
process, via the plurality of functional modules, the first data unit and the second data unit in parallel, the plurality of functional modules including a first functional module and a second functional module, wherein the first data unit is processed by the first functional module, and wherein the second data unit is processed by the second functional module; and
aggregate results of the processing performed by the first functional module and the second functional module; and
integrate the respective generated processing results.

10. The device as described in claim 9, wherein the processing of the real-time data stream includes dividing the real-time data stream based on a dimension, and wherein one data block of the real-time data stream is processed in parallel with another data block of the real-time data stream.

11. The device as described in claim 9, wherein the processing of the real-time data stream includes:
dividing the real-time data stream into a plurality of data blocks;
dividing each data block in parallel into the plurality of data units, and transmitting the plurality of data units to a corresponding plurality of functional modules to process the data units in parallel; and
aggregating results of data processing by the plurality of functional modules.

12. The device as described in claim 11, wherein the dividing of the real-time data stream into the plurality of data blocks is based on time.

13. The device as described in claim 9, wherein the processing of the one or more historical data stream includes dividing the one or more historical data streams based on one or more dimensions and performing parallel processing of the one or more historical data streams.

14. A computer program product being embodied in a non-transitory computer readable storage medium and comprising computer instructions for:
determining a number of a plurality of division modules based on flow volume of a raw data stream;
dividing the raw data stream into a real-time data stream and one or more historical data streams based on the number of the plurality of division modules;
processing the real-time data stream and the one or more historical data streams in parallel, comprising:
dividing the real-time data stream into a plurality of data units based on a plurality of dimensions, the plurality of dimensions including a first dimension and a second dimension, wherein a first data unit is associated with the first dimension, and wherein a second data unit is associated with the second dimension;
determining a number of a plurality of functional modules within a functional module group and a number of a plurality of functional module groups based on a number of the plurality of data units and resources available to be used to process the plurality of data units;
processing, via the plurality of functional modules, the first data unit and the second data unit in parallel, the plurality of functional modules including a first functional module and a second functional module, wherein the first data unit is processed by the first functional module, and wherein the second data unit is processed by the second functional module; and
aggregating results of the processing performed by the first functional module and the second functional module; and
integrating the respective generated processing results.

15. The computer program product as described in claim 14, wherein the processing of the real-time data stream is performed based on a dimension, and wherein one data block of the real-time data stream is processed in parallel with another data block of the real-time data stream.

16. The computer program product as described in claim 14, wherein the processing of the real-time data stream comprises:
dividing the real-time data stream into a plurality of data blocks;
dividing each data block into the plurality of data units in parallel;
separately transmitting the plurality of data units to a corresponding plurality of functional modules for processing in parallel in response to the dividing of each data block; and
aggregating the results of the processing of the plurality of functional modules.

17. The computer program product as described in claim 16, wherein the dividing of the real-time data stream into the plurality of data blocks is based on time.

18. The computer program product as described in claim 14, wherein the processing of the one or more historical data streams includes dividing the one or more historical data streams based on a dimension and the dividing of the one or more historical data streams is performed with the dividing of the real-time data stream in parallel.

19. A system, comprising:
a plurality of application servers comprising:
a determination module configured to determine a number of a plurality of division modules based on flow volume of a raw data stream;
a data recognition module configured to divide the raw data stream into a real-time data stream and one or more historical data streams based on the number of the plurality of division modules;
a parallel processing module configured to process the real-time data stream and the one or more historical data streams in parallel, and separately generate respective processing results, comprises to:
divide the real-time data stream into a plurality of data units based on a plurality of dimensions, the plurality of dimensions including a first dimension and a second dimension, wherein a first data unit is associated with the first dimension, and wherein a second data unit is associated with the second dimension;
determine a number of a plurality of functional modules within a functional module group and a number of a plurality of functional module groups based on a number of the plurality of data units and resources available to be used to process the plurality of data units;
process, via the plurality of functional modules, the first data unit and the second data unit in parallel, the plurality of functional modules including a first functional module and a second functional module, wherein the first data unit is processed by the first functional module, and wherein the second data unit is processed by the second functional module; and
aggregate results of the processing performed by the first functional module and the second functional module; and
a data integration module configured to integrate the respective generated results of processing.

20. The system as described in claim 19, wherein the parallel processing module divides the real-time data stream based on dimension, and wherein one data block of the real-time data stream is processed in parallel with another data block of the real-time data stream.

21. The system as described in claim 19, wherein the parallel processing module comprises:
a horizontal division module configured to divide the real-time data stream into a plurality of data blocks;
a plurality of vertical division modules configured to divide each data block in parallel into the plurality of data units, and transmit the plurality of data units to a corresponding plurality of functional modules to process the data units in parallel; and
a result aggregation module configured to aggregate the results of data processing by the plurality of functional modules.

22. The system as described in claim 21, wherein the horizontal division module divides the real-time data stream into the plurality of data blocks based on time.

23. The system as described in claim 19, wherein the parallel processing module divides the one or more historical data streams based on a dimension and performs parallel processing of the one or more historical data streams.

* * * * *